United States Patent
Hellholm et al.

(10) Patent No.: US 9,630,664 B2
(45) Date of Patent: Apr. 25, 2017

(54) LOAD-CARRYING FRAME AND VEHICLE PROVIDED WITH LOAD-CARRYING FRAME

(71) Applicant: BAE Systems Hägglunds Aktiebolag, Örnsköldsvik (SE)

(72) Inventors: Björn Hellholm, Arnäsvall (SE); Björn Nordberg, Örnsköldsvik (SE)

(73) Assignee: BAE SYSTEMS HÄGGLUNDS AKTIEBOLAG, Örnsköldsvik (SE)

( * ) Notice: Subject to any disclaimer, the term of this patent is extended or adjusted under 35 U.S.C. 154(b) by 0 days.

(21) Appl. No.: 14/787,176

(22) PCT Filed: Apr. 28, 2014

(86) PCT No.: PCT/SE2014/050516
§ 371 (c)(1),
(2) Date: Oct. 26, 2015

(87) PCT Pub. No.: WO2014/182220
PCT Pub. Date: Nov. 13, 2014

(65) Prior Publication Data
US 2016/0083026 A1    Mar. 24, 2016

(30) Foreign Application Priority Data
May 8, 2013  (SE) ...................................... 1350565

(51) Int. Cl.
*B62D 55/00*     (2006.01)
*B62D 55/065*    (2006.01)
(Continued)

(52) U.S. Cl.
CPC ....... *B62D 55/0655* (2013.01); *A01G 23/003* (2013.01); *B60D 5/00* (2013.01);
(Continued)

(58) Field of Classification Search
CPC ... B62D 55/0655; B62D 55/065; B62D 12/02
See application file for complete search history.

(56) References Cited

U.S. PATENT DOCUMENTS 3,183,991 A    5/1965   Gamaunt
3,419,097 A    12/1968  Nodwell et al.
(Continued)

FOREIGN PATENT DOCUMENTS

EP    1254827 A2    11/2002
EP    1254827 A3    4/2004
(Continued)

OTHER PUBLICATIONS

International Preliminary Report on Patentability received for PCT Patent Application No. PCT/SE2014/050516, mailed on Nov. 19, 2015, 7 pages.
(Continued)

*Primary Examiner* — Kevin Hurley
(74) *Attorney, Agent, or Firm* — Morrison & Foerster LLP

(57) ABSTRACT

The invention relates to load-carrying frame for carrying load of an articulated tracked vehicle comprising a front and a rear vehicle unit connected to each other through said load-carrying frame, wherein said front vehicle unit comprises a rolling link. The load-carrying frame is configured for rotatable attachment to the front vehicle unit via said rolling link for enabling rotation of the front vehicle unit relative to the load-carrying frame about an axis of said rolling link running in the axial main direction of extension of said load-carrying frame.

14 Claims, 9 Drawing Sheets

(51) Int. Cl.
*B62D 7/02* (2006.01)
*B62D 7/15* (2006.01)
*B62D 11/20* (2006.01)
*B60D 5/00* (2006.01)
*A01G 23/00* (2006.01)
*B60K 6/20* (2007.10)
*B62D 12/00* (2006.01)
*B62D 33/02* (2006.01)

(52) U.S. Cl.
CPC ............. *B60K 6/20* (2013.01); *B62D 7/026* (2013.01); *B62D 7/1509* (2013.01); *B62D 11/20* (2013.01); *B62D 12/00* (2013.01); *B62D 33/02* (2013.01); *B62D 55/065* (2013.01); *Y10S 903/903* (2013.01)

(56) References Cited

U.S. PATENT DOCUMENTS

| | | | |
|---|---|---|---|
| 3,473,619 A | 10/1969 | Dion | |
| 3,650,343 A | 3/1972 | Helsell | |
| 4,072,203 A * | 2/1978 | Pierson | B60F 5/003 180/9.44 |
| 4,174,757 A * | 11/1979 | Stedman | B62D 55/0655 172/292 |
| 4,325,445 A * | 4/1982 | Albee | B60B 9/22 180/14.4 |
| 5,125,467 A | 6/1992 | Mancheron et al. | |
| 5,632,350 A | 5/1997 | Gauvin | |
| 5,806,870 A * | 9/1998 | Hull | B62D 21/186 280/400 |
| 5,921,338 A * | 7/1999 | Edmondson | B60G 21/045 180/6.5 |
| 6,231,061 B1 * | 5/2001 | Cope | B60K 17/24 180/312 |
| 8,991,528 B2 * | 3/2015 | Hellholm | B60K 6/46 180/14.2 |
| 9,061,706 B2 * | 6/2015 | Grossman | B62D 55/00 |
| 2006/0278418 A1 | 12/2006 | Vandeligt et al. | |

FOREIGN PATENT DOCUMENTS

| | | |
|---|---|---|
| SU | 981065 A1 | 12/1982 |
| WO | 96/34776 A1 | 11/1996 |

OTHER PUBLICATIONS

International Search Report and Written Opinion received for PCT Application No. PCT/SE2014/050516, mailed on Aug. 21, 2014, 10 pages.

Extended European Search Report (includes Supplementary European Search Report and Search Opinion) received for European Patent Application No. 14795123.0, mailed on Feb. 15, 2017, 7 pages.

* cited by examiner

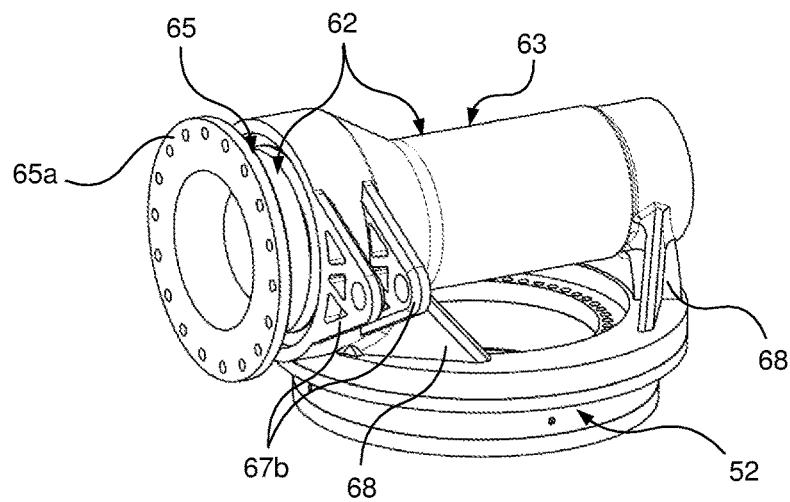
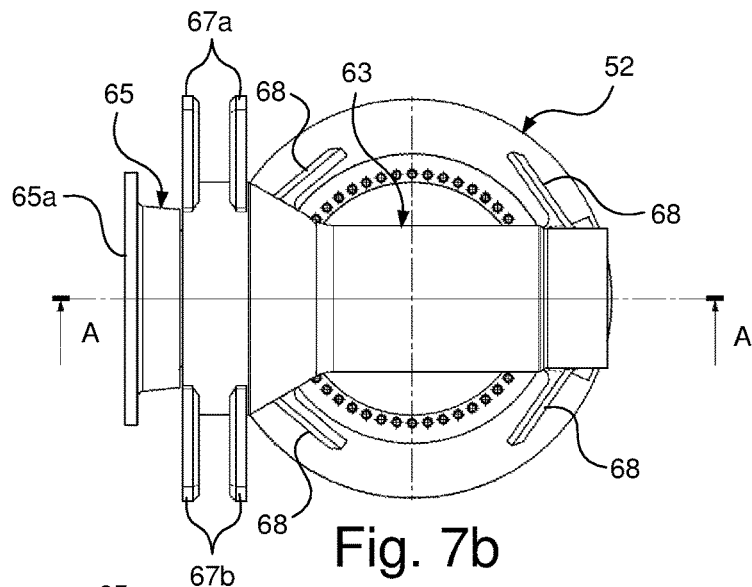
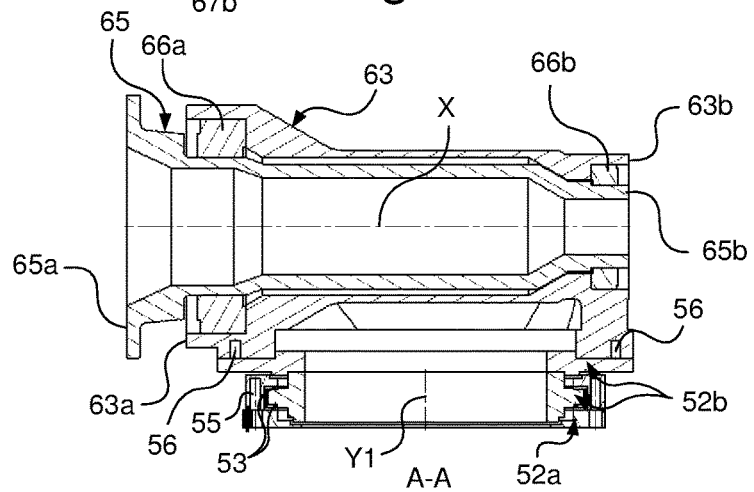
Fig. 7a
Fig. 7b
Fig. 7c

LOAD-CARRYING FRAME AND VEHICLE PROVIDED WITH LOAD-CARRYING FRAME

CROSS REFERENCE TO RELATED APPLICATIONS

This application is a U.S. National Stage patent application of PCT/SE2014/050516, filed on Apr. 28, 2014, which claims priority to Swedish Patent Application No. 1350565-6, filed on May 8, 2013, the entire contents of which are incorporated herein by reference.

FIELD OF THE INVENTION

The present invention relates to a load-carrying frame for a vehicle according to the preamble of claim 1. The present invention also relates to a vehicle, such as a tracked vehicle.

BACKGROUND OF THE INVENTION

Today's track driven/tracked and wheeled articulated vehicles for forestry work typically consist of two vehicle units in form of a rear and a front vehicle unit where the front and the rear vehicle units are connected by means of an articulated link section. The ability to transport cargo, the loading capability and the manoeuvrability of such and similar vehicles are limited.

Consequently, there is a need for presenting improvements in load-carrying structures for tracked vehicles intended for forestry work.

SUMMARY OF THE INVENTION

One object of the present invention is to provide a load-carrying frame for a tracked forestry vehicle enabling improved load distribution.

Another object of the present invention is to provide a load-carrying frame for a tracked forestry vehicle enabling improved manoeuvrability of the vehicle.

Another object of the present invention is to provide a load-carrying frame for a tracked vehicle facilitating configuration of the vehicle.

These and other objects, which will become apparent from the following description, are achieved by means of load-carrying frame for tracked forestry vehicles and a vehicle of the type mentioned in the introduction, further exhibiting the features described below. Preferred embodiments of the load-carrying frame and the vehicle are defined below.

According to one aspect there is provided a load-carrying frame for carrying load of an articulated tracked vehicle, such as a tracked forwarder or another type of forestry machine, wherein the vehicle comprises a front and a rear vehicle unit connected to each other by means of said load-carrying frame. The front vehicle unit comprises a rolling link and the load-carrying frame is configured for rotatable attachment to the front vehicle unit via said rolling link for enabling rotation of the front vehicle unit relative to the load-carrying frame about the axis of said rolling link running in the axial main direction of extension of said load-carrying frame, such that said front and rear vehicle units are permitted to rotate relative to each other about said rolling link. Hereby, rotation of said vehicle unit relative to the load-carrying frame about an axis running in the main direction of extension of the load-carrying frame is facilitated, whereby the manoeuvrability of the vehicle and the ability of the vehicle to follow the ground are further improved.

In one embodiment, the load-carrying frame is configured for rotatable attachment to the front vehicle unit via said rolling link such that the axis of said rolling link runs through the load-carrying frame, meaning that the rolling link and the load-carrying frame are located in substantially the same horizontal plane. Hereby, torque that otherwise may arise around the load-carrying frame is minimized, whereby the stability of the vehicle is increased. Thereby, the vehicle can be driven in a faster and safer way.

In a preferred embodiment, the load-carrying frame is thus configured for attachment to a rolling link located in the extension of the load-carrying frame, in the axial main direction of extension thereof. Thereby, the rolling link axis runs through the load-carrying frame and, preferably, it runs substantially through the centre of gravity of the load-carrying frame. Hereby, frame construction stability and vehicle stability is further improved.

Preferably, the rolling link is arranged in the extension of the main direction of extension of the load-carrying frame such that the axis of the rolling link substantially coincides with a horizontal plane through the load-carrying frame.

According to one embodiment, a front end of the load-carrying frame is configured for rotatable attachment to a roll bearing configuration comprising said rolling link, so as to effectuate rotation of the load-carrying frame relative to the front vehicle unit, about the rolling link axis.

The roll bearing configuration comprises, in one embodiment, a roll bearing cylinder and a bearing housing, wherein the roll bearing cylinder is rotatably journaled in said bearing housing. In one embodiment, said front end of the load-carrying frame is configured for attachment to said roll bearing cylinder, e.g. by means of a screw joint, whereby the load-carrying frame can be made to rotate relative to said bearing housing and the front vehicle unit. Accordingly, the bearing housing is attached to the front vehicle unit in a way that does not permit rotation of the bearing housing about the axis of the rolling link.

Furthermore, the load-carrying frame is preferably configured for pivotal attachment to said front vehicle unit via a front vertical steering link for enabling pivoting of said front vehicle unit relative to the load-carrying frame about a substantially vertical axis of the front vertical steering link.

The front vertical steering link is arranged substantially centrally of the front vehicle unit. Thereby, improved load-distribution is achieved, which improves manoeuvrability of the vehicle. Preferably, the load-carrying frame is rigidly configured and configured to distribute the load substantially centrally over both the front and rear vehicle units, which further improves the stability and manoeuvring capability of the vehicle.

In one embodiment, the load-carrying frame is configured for pivotal attachment to said front vehicle unit via a steering device comprising both said rolling link and said front vertical steering link. In this way, a compact construction for both pivotal and rotational steering is achieved.

Preferably, the steering device comprises steering cylinders for steering the load-carrying frame relative to the front vehicle unit about the axis of the front vertical steering link. Furthermore, the steering device preferably comprises roll steering cylinders for steering the load-carrying frame relative to the front vehicle unit about the axis of said rolling link.

Preferably, the load-carrying frame is also configured for pivotal attachment to the rear vehicle unit via a rear vertical steering link for enabling pivoting of said rear vehicle unit relative to the load-carrying frame about a substantially vertical axis of the rear vertical steering link. This further improves the manoeuvrability of the vehicle.

According to one embodiment, the load-carrying frame is configured for pivotal attachment to said rear vehicle unit via a rear steering device, which, according to one alternative, comprises steering cylinders for steering the load-carrying frame relative to the rear vehicle unit about the axis of the rear vertical steering link.

The load-carrying frame is preferably configured for pivotal attachment to the front and rear vehicle units in a manner making the front and rear vehicle units individually and independently steerable about the respective vertical axes.

Furthermore, the load-carrying frame is advantageously configured for pivotal attachment about said front vertical steering link, said rear vertical steering link and said rolling link in a manner enabling individual control of the above mentioned steering members for steering about the respective link, i.e. in a manner enabling individual and independent steering of the front vehicle unit relative to the load-carrying frame about the front vertical steering link and the rolling link, as well as about the rear vertical steering link.

According to another aspect there is provided a load-carrying frame for carrying load of an articulated tracked vehicle comprising a front and a rear vehicle unit, wherein said load-carrying frame is rigidly configured and arranged for carrying load, wherein the load-carrying frame is configured to distribute the load substantially centrally over said front and rear vehicle units. Hereby, improved load distribution of the vehicle is obtained, which improves the manoeuvrability of the vehicle. Thus, by distributing the load evenly over the vehicle, the track assemblies of the front vehicle unit and the track assemblies of the rear vehicle unit of the tracked vehicle carry the same load, allowing the track assemblies of the front and rear vehicle units to be equally sized. This allows similar track assemblies to be used for the front and the rear vehicle units, and so that similar vehicle units comprising similar centre beams/chassis beams and similar suspension configurations for suspension and resilient suspension of track assemblies, thus reducing the number of vehicle components and so the manufacturing costs, stock of spare parts and maintenance.

According to one embodiment of the load-carrying frame, said load-carrying frame is configured for pivotal attachment to said front and rear vehicle units to enable pivoting of said front and rear vehicle units relative to each other and relative to the load-carrying frame. Hereby the manoeuvrability of the vehicle is improved.

According to one embodiment of the load-carrying frame, the load-carrying frame is, in a basic position of the vehicle in which the longitudinal extensions of the front and rear vehicle units are substantially aligned, arranged to extend over a rear section of the front vehicle unit and extend substantially over the rear vehicle unit such that the weight of the load carried by the load-carrying frame is carried centrally on the respective vehicle unit. Hereby improved load distribution of the vehicle is enabled, which improves the manoeuvrability of the vehicle and enables the vehicle units to be equally dimensioned, and so allows use of vehicle units having the same basic configuration comprising track assemblies and centre beam/chassis beam as well as suspension device for track assemblies.

According to one embodiment of the load-carrying frame, said load-carrying frame is configured for connection to a front steering device for said pivotal attachment to said front vehicle unit. Hereby, pivoting of said front vehicle unit relative to the load-carrying frame is facilitated, whereby the manoeuvrability of the vehicle is further improved.

According to one embodiment of the load-carrying frame, said front steering device comprises a front vertical steering link, wherein the load-carrying frame is configured for pivotal attachment to said front vehicle unit via said front vertical steering link to enable pivoting of the front vehicle unit and the load-carrying frame relative to each other about the axis of said front vertical steering link. Hereby pivoting of said front vehicle unit relative to the load-carrying frame is facilitated, whereby the manoeuvrability of the vehicle is further improved.

According to one embodiment of the load-carrying frame, said front vertical steering link is arranged substantially centrally of the front vehicle unit. This will facilitate steering of said front vehicle unit relative to the load-carrying frame, wherein the manoeuvrability of the vehicle is further improved. Furthermore, the force generated by the load will act centrally on the front vehicle unit, whereby the pressure from the track assemblies of the front vehicle unit on the ground, i.e. the ground pressure, will be evenly distributed over the contact surfaces between the ground and the endless tracks of the track assemblies. This creates a low ground pressure which is advantageous since damages to the ground are hereby efficiently minimized.

According to one embodiment of the load-carrying frame, said front steering device comprises steering cylinders for steering the load-carrying frame relative to the front vehicle unit about the axis of said front vertical steering link. Hereby steering of the load-carrying frame relative to the front vehicle unit is facilitated.

According to one embodiment of the load-carrying frame, said front steering device comprises a rolling link, wherein the load-carrying frame is configured for rotatable attachment to said front vehicle unit via said rolling link to enable rotation of the front vehicle unit and the load-carrying frame relative to each other about the axis of said rolling link running in the axial main direction of extension of the load-carrying frame. Hereby rotation of said vehicle unit relative to the load-carrying frame about a longitudinal axis of the load-carrying frame is facilitated, whereby the manoeuvrability of the vehicle and the vehicle's ability to follow the ground is further improved.

According to one embodiment of the load-carrying frame, said front steering device comprises roll steering cylinders for steering the load-carrying frame relative to the front vehicle unit about the axis of said rolling link. Hereby rotation of the load-carrying frame relative to the front vehicle unit about an axis in the main direction of extension of the load-carrying frame is facilitated. Said roll steering cylinders are, according to one alternative, provided with functionality for stabilizing the vehicle units relative to each other, and functionality for enhanced comfort. According to one alternative, said roll steering cylinders are provided with a locking functionality for stabilizing the front vehicle unit in relation to the rear vehicle unit and the load-carrying frame. According to one alternative, said roll steering cylinders are provided with damping functionality to enhance vehicle comfort. According to one alternative, said roll steering cylinders are provided with angle adjustment functionality for adjusting the angle so as to e.g. level the load-carrying frame.

According to one embodiment of the load-carrying frame, the load-carrying frame is configured for connection to a rear steering device for said pivotal attachment to said rear vehicle unit. Hereby pivoting of said rear vehicle unit relative to the load-carrying frame is facilitated, whereby the manoeuvrability of the vehicle is further improved.

According to one embodiment of the load-carrying frame, said rear steering device comprises a rear vertical steering link, wherein the load-carrying frame is configured for pivotal attachment to said rear vehicle unit via said rear vertical steering link to enable pivoting of the rear vehicle unit and the load-carrying frame relative to each other about the axis of said rear vertical steering link. Hereby pivoting of said rear vehicle unit relative to the load-carrying frame is facilitated, whereby the manoeuvrability of the vehicle is further improved.

According to one embodiment of the load-carrying frame, said rear vertical steering link is arranged substantially centrally of the rear vehicle unit. Hereby the steering of said rear vehicle unit relative to the load-carrying frame is facilitated, whereby manoeuvrability of the vehicle is further improved. Furthermore, the force generated by the load will act centrally on the front vehicle unit, whereby the pressure from the track assemblies of the front vehicle unit on the ground, i.e. the ground pressure, will be evenly distributed over the contact surface between the ground and the endless tracks of the track assemblies. This creates an even and low ground pressure which is advantageous since damages to the ground are hereby efficiently minimized.

According to one embodiment of the load-carrying frame, said rear steering device comprises steering cylinders for steering the load-carrying frame relative to the rear vehicle unit about the axis of said rear vertical steering link. Hereby steering of the load-carrying frame relative to the rear vehicle unit is facilitated.

According to one embodiment of the load-carrying frame, the load-carrying frame is configured to extend over a front centre beam of the front vehicle unit such that said front steering device rests on the front centre beam. Hereby load distribution of the vehicle is facilitated, which enables improved manoeuvrability of the vehicle.

According to one embodiment of the load-carrying frame, the load-carrying frame is configured to extend over a rear centre beam of the rear vehicle unit such that said rear steering device rests on the rear centre beam. Hereby load distribution of the vehicle is facilitated, which enables improved manoeuvrability of the vehicle.

According to another aspect there is provided a vehicle, for example a tracked vehicle, comprising at least one load-carrying frame according to any of the above embodiments of the present invention.

According to one embodiment, the vehicle is a forestry machine.

According to one embodiment, the vehicle is a tracked forwarder.

According to one embodiment, the vehicle is a diesel-electric vehicle.

BRIEF DESCRIPTION OF THE DRAWINGS

The present invention will be better understood by reference to the following detailed description when read in conjunction with the accompanying drawings, wherein like reference numerals refer to like parts throughout the various views, and in which:

FIG. 7a schematically illustrates a perspective view of a portion of a steering device for the front vehicle unit, arranged to be connected to and interact with the load-carrying frame of the present invention;

FIG. 7b schematically illustrates a top view of the steering device in FIG. 7a;

FIG. 7c schematically illustrates a cross section of the steering device shown in FIG. 7b FIG. 8a schematically illustrates a perspective view of a portion of a steering device for the rear vehicle unit, arranged to be connected to and interact with the load-carrying frame of the present invention;

FIG. 8b schematically illustrates a top view of the steering device in FIG. 8a;

DETAILED DESCRIPTION OF THE INVENTION

Figure 1:
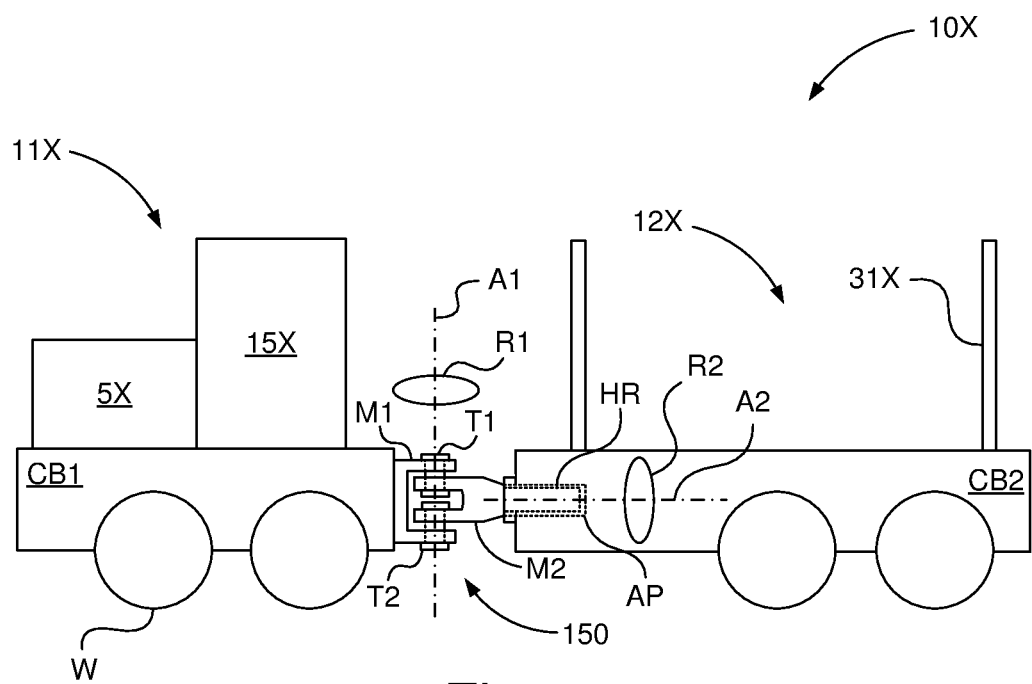
FIG. 1 schematically illustrates a side view of a wheeled articulated forestry vehicle according to prior art.

FIG. 1 shows a configuration of a wheeled forestry vehicle 10X in form of a forwarder with a load-carrying frame according to prior art.

Said vehicle 10X according to prior art is an articulated forestry vehicle, such as a wheeled articulated forwarder arranged to transport cut timber from a harvesting site to a landing site.

Said vehicle 10X comprises a front 11X and a rear vehicle unit 12X connected via an articulated link section.

Said vehicle comprises ground-engaging means in form of a plurality of wheels W. Said front vehicle unit comprises an internal combustion engine 5X for propulsion of said vehicle 10X, and a driver's cabin 15X.

Said rear vehicle unit comprises a load-carrying configuration 31X for carrying load in form of timber. Said front drive vehicle unit comprises a support structure CB1, such as a centre beam for carrying overlying vehicle structure. Said rear vehicle unit comprises a load-carrying structure CB2 for carrying load in form of timber.

Said articulated link section is arranged in between said front and rear vehicle units. In more detail, said articulated link section is disposed in between and connecting said support structure of the front vehicle unit and said load-carrying structure of the rear vehicle unit.

Said articulated link section is constituted by a steering device 150. Said steering device 150 comprises a vertical steering link and a rolling link.

Said vertical steering link is arranged to enable pivoting between the rear and front vehicle units in the direction R1 about an axis A1 of the vertical steering link.

Said rolling link is arranged to enable rotation between the rear and the front vehicle units in the direction R2 about an axis A2 of the rolling link.

Said vertical steering link of said steering device comprises a first articulated link M1 shaped like two tongues protruding from and fixed to said first vehicle unit, wherein each of said tongues comprises a loop through which said axis A1 runs.

Said first articulated link structure is arranged to be rotatably attached to an intermediate articulated link structure M2 via a first and a second pin T1, T2 running through said loops to enable rotation between the front and rear vehicle units about said axis A1.

Said second articulated link structure M2 is provided with a cylinder HR protruding from said second articulated link structure opposite said load-carrying structure CB2 of said rear vehicle unit. Said load-carrying structure is provided with an aperture AP adapted to receive said cylinder of said second articulated link structure.

The second articulated link structure is further arranged to be rotatably attached to said load-carrying structure via said cylinder running in said aperture. In more detail, said second articulated link structure is arranged to be rotatably attached to said load-carrying structure to enable rotation of said front vehicle unit and said rear vehicle unit relative to each other in a direction R2 about an axis A2 running in the longitudinal direction of said vehicle.

This configuration of a vehicle according to prior art is, however, associated with disadvantages in terms of limited load distribution and manoeuvrability. For example, practically all load in form of timber is carried by the rear vehicle unit. Furthermore, the maximum steering angle that can be achieved between the front and the rear vehicle unit is limited since the articulated link is disposed in between said front and rear vehicle units, i.e. in between said support structure of said front vehicle unit and said load-carrying structure of said rear vehicle unit.

Herein, the term "track support beam" refers to a structural element arranged to support ground-engaging means such as e.g. an endless track as well as drive wheel and support wheels.

Herein, the term "track assembly" refers to a unit of the tracked vehicle comprising track support beam, drive wheel and support wheels as well as a circumferential endless track, which unit is arranged to comprise ground-engaging means and configured to propel the vehicle and thus form at least part of a drive unit of the tracked vehicle.

Herein, the term "track assembly pair" refers to opposite track assemblies of a vehicle unit of the vehicle, one track assembly constituting a right track assembly and the opposite track assembly constituting a left track assembly.

Herein, the term "articulated vehicle" (eng. articulated vehicle) refers to a vehicle with at least a front and a rear vehicle unit which are pivotable relative to each other about at least one joint.

Herein, the term "centrally of the vehicle unit" refers to an area of the vehicle unit which may be located substantially centrally relative to the longitudinal and lateral extensions of the vehicle unit. The term "centrally of the vehicle unit" refers to an area of the tracked vehicle between the track assemblies of the track assembly pair and inside the longitudinal extension of the track assemblies, preferably an area substantially halfway between the front end and the rear end of the track assembly.

Herein, the term "centrally of the track assembly pair" refers to an area of the vehicle unit centrally arranged between the track assemblies of the track assembly pair and centrally in the longitudinal direction of the track assembly pair.

Figure 2:
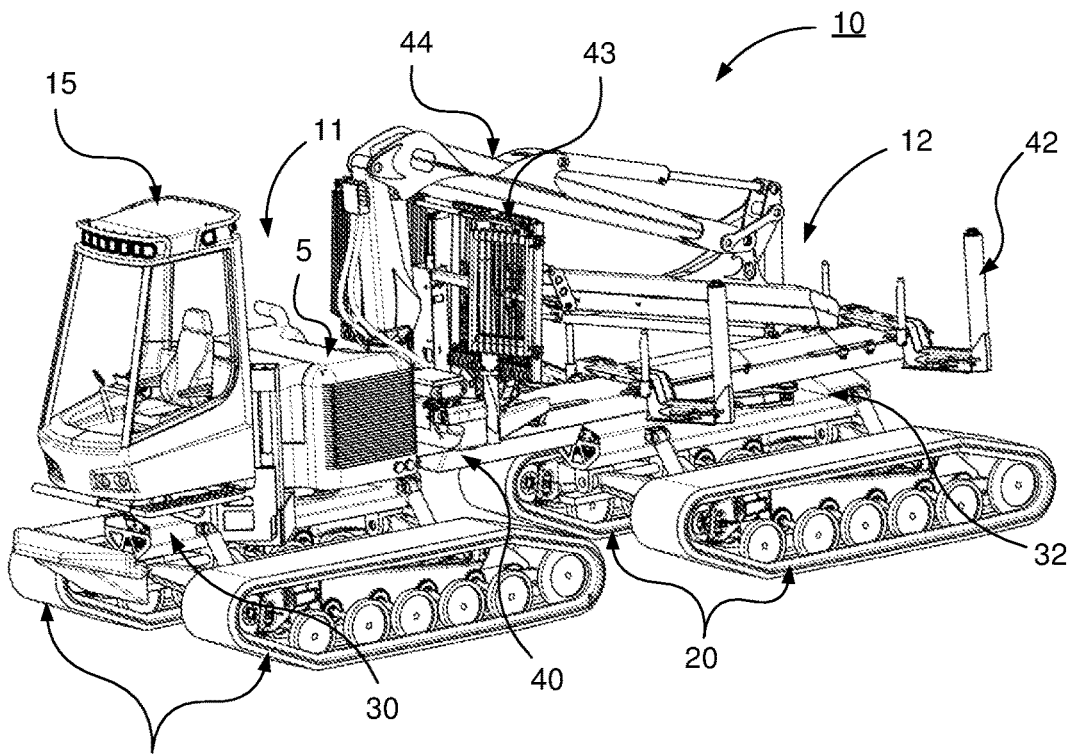
FIG. 2 schematically illustrates a perspective view of a tracked vehicle comprising a load-carrying frame according to an embodiment of the invention.

Referring now to FIG. 2, a tracked vehicle 10 according to the present invention is shown, provided with a front vehicle unit 11 and a rear vehicle unit 12.

Each of the front and rear vehicle units comprises a track assembly pair 20. Said track assembly pair 20 is constituted by or comprised of a drive unit pair. Said track assembly pair 20 comprises two track assemblies 21 arranged on opposite sides of the vehicle. The respective track assembly 21 is constituted by or comprised of a drive unit. Each track assembly 21 is constituted by a driving track assembly and is arranged for propulsion of the vehicle. The respective track assembly pair 20 is connected to an intermediate centre beam 30, 32, such as a chassis beam.

Said centre beam 30, 32 of the respective vehicle unit 11, 12 is arranged for support of vehicle structure, e.g. in form of a vehicle cabin, power supply, load-carrying structure and a crane.

In the vehicle 10 according to this configuration, the centre beam 30 of the front vehicle unit 11 is arranged to carry a vehicle cabin 15 and power supply 5, such as a combustion engine, where the internal combustion engine according to one alternative is constituted by a diesel engine.

In the vehicle 10 according to this configuration, the centre beams 30, 32 of the front and rear vehicle units 11, 12 are further arranged to support a load-carrying structure comprising a load-carrying frame 40, wherein said load-carrying frame 40 according to this alternative is configured to carry a U-beam configuration 42 or a load-carrying configuration 42 for carrying timber and a loading gate 43. The load-carrying frame is, according to this alternative, also arranged to carry a crane 44 for loading/unloading timber. The load-carrying frame 40 is configured to distribute the load substantially centrally over the front and the rear vehicle units 11, 12.

The exemplified vehicle 10 is a tracked forestry vehicle in form of a forwarder intended to transport the timber from a harvesting site to a loading site. The vehicle 10 of the present invention may be constituted by any suitable type of tracked vehicle. The vehicle 10 is, according to one alternative, a harvester intended to harvest the timber.

The exemplified vehicle 10 is a diesel-electric driven vehicle. The vehicle 10 may according to one alternative have any suitable power supply for the propulsion of the vehicle. The vehicle 10 is according to one alternative a hybrid-powered vehicle. The vehicle 10 is according to one alternative electrically driven, where power according to one alternative is supplied by means of an energy storage device such as a battery unit, fuel cell or capacitor unit.

Figure 3:
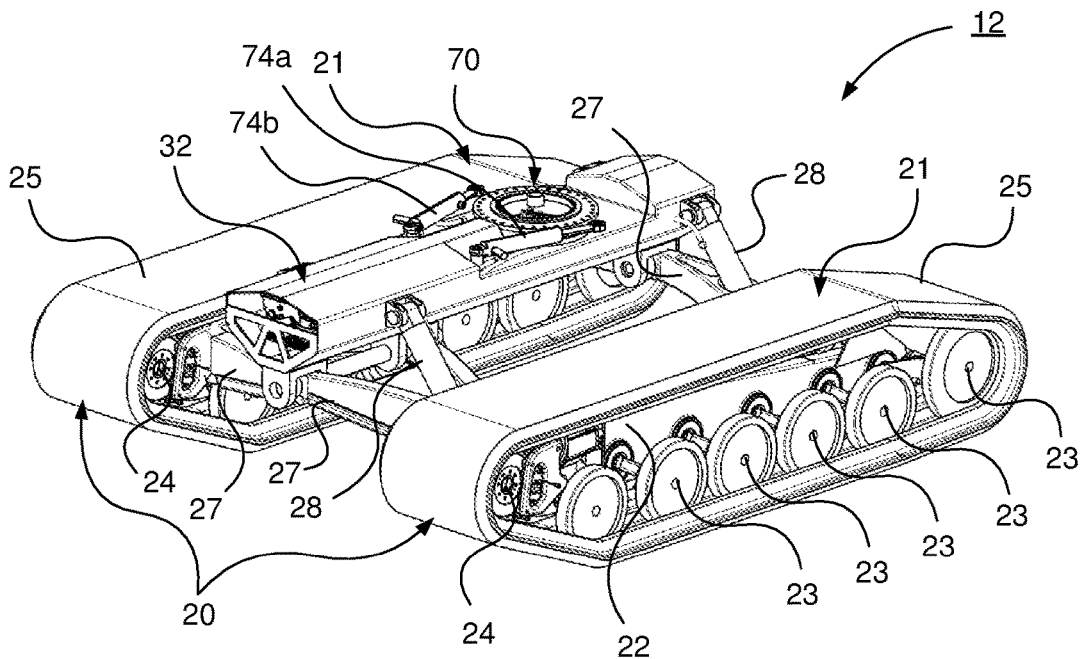
FIG. 3 schematically illustrates a perspective view of a vehicle unit of the vehicle in FIG. 2 according to an embodiment of the present invention.

With reference now made to FIG. 3, there is shown a rear vehicle unit 12 comprising a track assembly pair 20 connected to an intermediate centre beam 32.

In more detail, there is shown a rear vehicle unit 12 with reference to FIG. 2, with a track assembly pair 20 and with a centre beam connected to and configured for suspension of the centre beam 32.

The respective track assembly 21 is arranged to drive the vehicle unit 12. The respective track assembly 21 comprises a track support beam 22, which is here constituted by a skid beam. The respective track assembly further comprises a set of support wheels 23, at least one drive wheel 24, and an endless track 25. Said endless track 25 is arranged to run over the at least one drive wheel 24 and said set of support wheels 23.

Said set of support wheels 23 and the at least one drive wheel 24 are arranged to be rotatably supported by said track support beam 22 in a suitable manner. Said set of support wheels 23 is arranged in a pair configuration, meaning that the respective support wheels 23 of each pair configuration are arranged on opposite sides of said track support beam 22. The support wheel arranged at the very rear of the track support beam 22 also has a track tension wheel function and is constituted by a tension wheel.

Said track assembly 21 further comprises also an electrical drive unit (not shown) operatively coupled to said at least one drive wheel. According to one alternative, the respective track assembly comprises an electrical drive unit. According to one alternative, said electrical drive unit is arranged in said track support beam 22 of said track assembly 21.

In more detail, said centre beam 32 is arranged for connection to and suspension of said two opposite track assemblies 21, i.e. said track assembly pair 20, via a suspension configuration comprising a trailing arm configuration in form of trailing arms 27 articulately attached in one end to the track support beam 22 and in the other end to the centre beam 32, and gas hydraulic cylinders 28 articulately attached in one end to the track support beam 22 and in the other end to the centre beam 32 The two track assemblies 21 of the track assembly pair 20 are arranged on opposite sides of the centre beam 32 so that the centre beam 32 is arranged in between said track assemblies 21 of the track assembly pair 21 and such that the main extension direction of the centre beam 32 is substantially parallel to the main extension direction of the respective track assembly 21 of the track assembly pair 20, as shown in FIG. 3. The same applies to the front vehicle unit 11 shown in FIG. 2.

The front vehicle unit 11 and the rear vehicle unit 12 are in a basic configuration in which the vehicle unit comprises a track assembly pair 20, a centre bream 30, 32 with a vertical steering link and a suspension configuration for suspension and resilient suspension of track assemblies, designed and sized substantially identical, thereby reducing the number of vehicle components and so reducing costs associated with construction, spare part stock and maintenance.

According to the embodiment described above, the respective track assemblies 21 of front vehicle unit 11 and the rear vehicle unit 12 are driving. The driving of the respective track assembly is, according to one alternative, individual driving of the respective track assembly 21. According to one alternative, the vehicle units 11, 12 could be driven by driving the respective track assembly pair, i.e. by commonly driving the respective track assembly pair by means of drive means.

Figure 9:
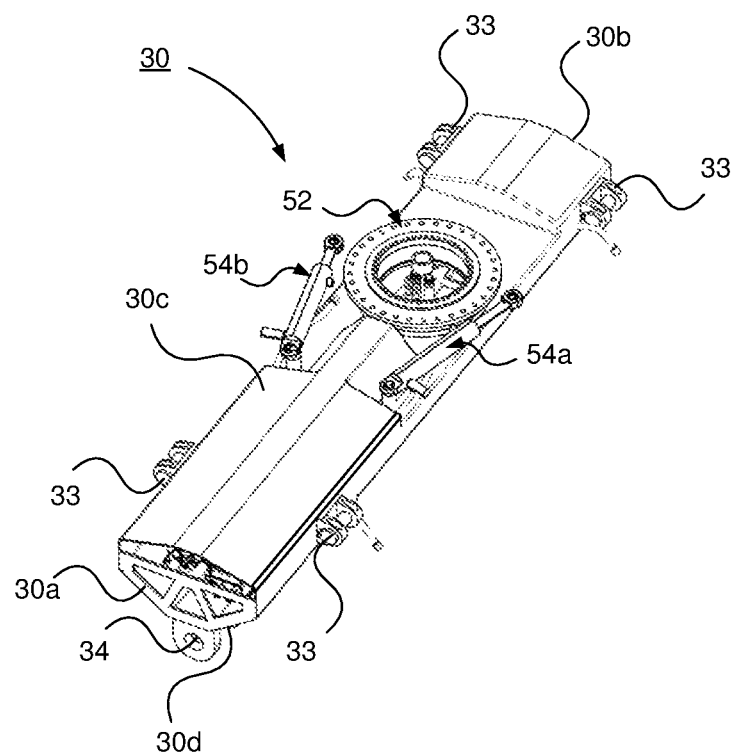
FIG. 9 schematically illustrates a perspective view of a centre beam for connection to the load-carrying frame of the present invention.

FIG. 9 shows a perspective view of the front centre beam 30 of the front vehicle unit.

Figure 4A:
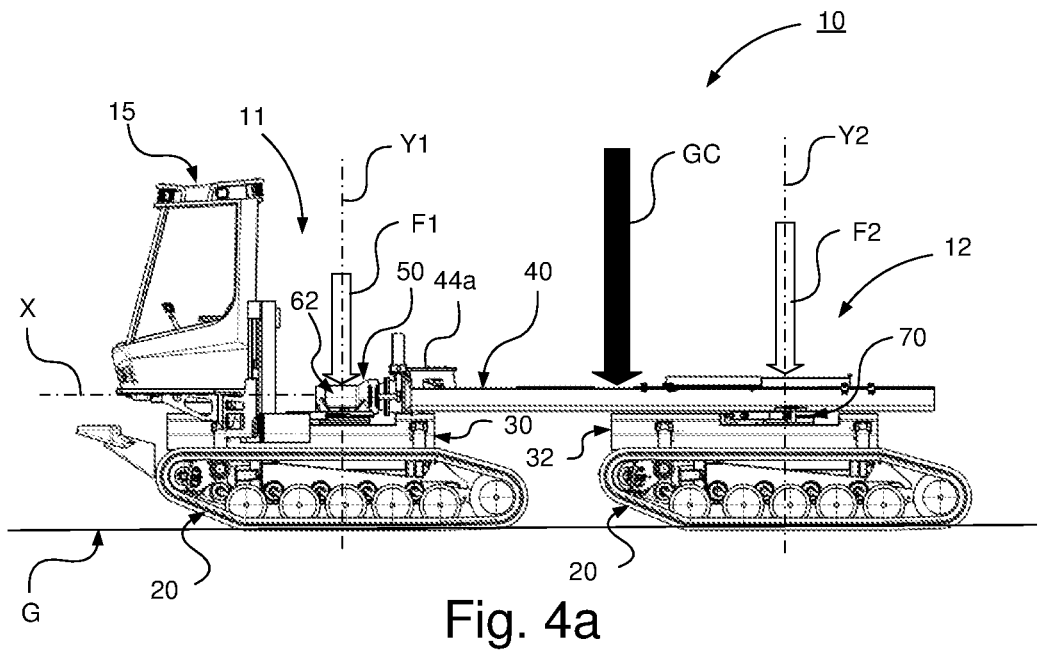
FIG. 4a schematically illustrates a side view of a tracked vehicle comprising a load-carrying frame according to an embodiment of the present invention.
Figure 4B:
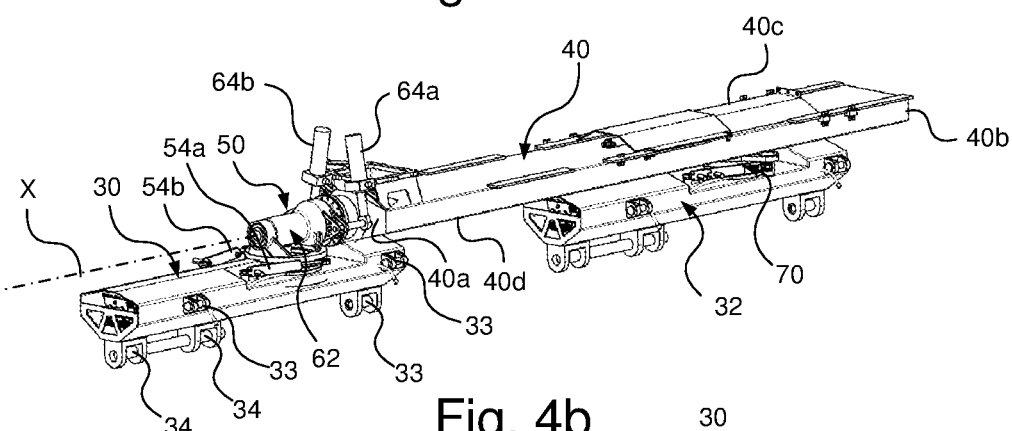
FIG. 4b schematically illustrates a perspective view of the load-carrying frame shown in FIG. 4a connected to underlying chassis beams according to an embodiment of the present invention.
Figure 4C:
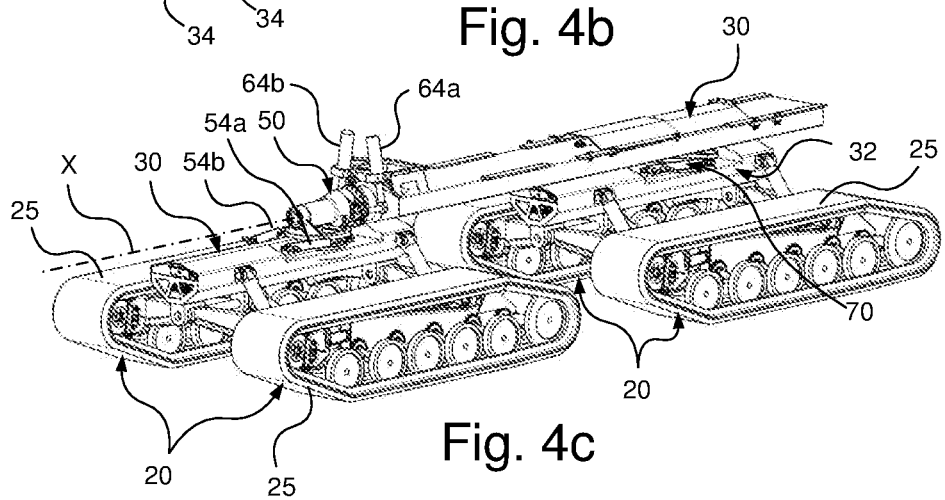
FIG. 4c schematically illustrates a perspective view of a vehicle with a front and a rear vehicle unit connected to the load-carrying frame shown in FIG. 4a according to an embodiment of the present invention.

FIG. 4a shows a side view of a load-carrying frame 40 arranged on a vehicle 10 in form of a tracked forwarder according to an embodiment of the present invention. FIG. 4b shows a perspective view of the load-carrying frame 40 connected to centre beams 30, 32 of the vehicle 10. FIG. 4c shows a perspective view of the load-carrying frame 40 connected to centre beams 30, 32 connected to track assembly pairs 20 of the vehicle 10.

The load-carrying frame 40 is arranged to carry load of the vehicle 10. The vehicle 10 comprises a front and a rear vehicle unit 11, 12. Said vehicle 10 is, according to one alternative, constituted by the vehicle 10 exemplified in FIGS. 1 and 2.

Said load-carrying frame 40 is rigidly configured and comprises/consists of a rigid frame member. Said load-carrying frame 40 is arranged such that the load is distributed over said front and rear vehicle units 11, 12 of the vehicle 10.

Said load-carrying frame 40 has a front side 40a arranged to face forward in the longitudinal extension of the vehicle 10 when the longitudinal extensions of the front and rear vehicle units 11, 12 are substantially aligned. Said load-carrying frame 40 has a rear side 40b arranged to face backward in the longitudinal extension of the vehicle 10 when the longitudinal extensions of the front and rear vehicle units 11, 12 are substantially aligned. Said load-carrying frame 40 further has a top side 40c against which the load is arranged to rest, and an underside 40d intended to be facing and be connected to the centre beam 30, 32 of the respective vehicle unit 11, 12 11, 12.

Said load-carrying frame 40 is configured for pivotal attachment to said front and rear vehicle units 11, 12 to enable pivoting of said front and rear vehicle units 11, 12 relative to each other.

The load-carrying frame 40 is configured to enable pivoting about a front vertical steering link 52. In more detail, the load-carrying frame 40 is configured for pivotal attachment about said front vertical steering link 52. Hereby the front vehicle unit 11 and the load-carrying frame 40 are permitted to pivot relative to each other about an axis Y1 of said front vertical steering link 52. The axis Y1 of said front vertical steering link 52 extends substantially perpendicular to the axial main direction of extension of the front vehicle unit 11, and perpendicular to the lateral direction of the front vehicle unit 11.

Said front vertical steering link 52 is arranged substantially centrally relative to the front vehicle unit 11. The axis Y1 of said front vertical steering link 52 is thus arranged to run substantially centrally relative to the front vehicle unit 11. The axis Y1 of said front vertical steering link 52 is arranged to run substantially centrally relative to the longitudinal and lateral directions of the front vehicle unit 11. Said front vertical steering link 52 is arranged substantially centrally between the respective track assemblies 21 of the track assembly pair 20 of the front vehicle unit 11. The axis Y1 of said front vertical steering link 52 is arranged to run substantially centrally between the respective track assemblies 21 of the track assembly pair 20 of the front vehicle unit 11. The axis Y1 of said front vertical steering link 52 is arranged to run substantially centrally relative to the longitudinal extension of the track assembly pair 20 of the front vehicle unit 11.

The load-carrying frame 40 is configured to enable pivoting about a rear vertical steering link 72. In more detail, the load-carrying frame 40 is configured for pivotal attachment about said rear vertical steering link 72. Hereby the rear vehicle unit 12 and the load-carrying frame 40 are permitted to pivot relative to each other about an axis Y2 of said rear vertical steering link 72. The axis Y2 of said rear vertical steering link 72 runs substantially perpendicular to the axial main direction of extension of the rear vehicle unit 12, and perpendicular to the lateral direction of extension of the rear vehicle unit 12.

Said rear vertical steering link 72 is arranged substantially centrally relative to the rear vehicle unit 12. The axis Y2 of said rear vertical steering link 72 is thus arranged to run substantially centrally relative to the rear vehicle unit 12. The axis Y2 of said rear vertical steering link 72 is arranged to run substantially centrally relative to the longitudinal and lateral extensions of the rear vehicle unit 12. Said rear vertical steering link 72 is arranged substantially centrally between the respective track assemblies 21 of the track assembly pair 20 of the rear vehicle unit 12. The axis Y2 of said rear vertical steering link 72 is arranged to run substantially centrally relative to the longitudinal extension of the track assembly pair 20 of the rear vehicle unit 12.

The load-carrying frame 40 is configured to enable rotation about a rolling link 62. In more detail, the load-carrying frame 40 is configured for rotatable attachment about said rolling link 62. Hereby, said front vehicle unit and said rear vehicle unit are permitted to rotate relative to each other about said rolling link 62. According to this embodiment, the front vehicle unit 11 and the load-carrying frame 40 are permitted to rotate relative to each other about an axis of said rolling link 62. The axis X of said rolling link 62 runs in the axial main direction of extension of the load-carrying frame 40.

The axis X of said rolling link 62 is, in this embodiment, arranged to run such that it intersects the axis Y1 of the front vertical steering link 52. The axis X of said rolling link 62 is arranged to run substantially perpendicular to said front vertical steering link 52.

The fact that the said front and rear vehicle units 11, 12 of the vehicle 10 thus are connected via said load-carrying frame 40 enables pivoting of said front and rear vehicle unit 11, 12 relative to each other about the axis Y1, Y2 of the respective front and rear vertical steering links 52, 72, and also pivoting of said front and rear vehicle units 11, 12 relative to the load-carrying frame 40 about the axis Y1, Y2 of the respective front and rear vertical steering links 52, 72.

The fact that the said front and rear vehicle units 11, 12 of the vehicle thus are connected via said load-carrying frame 40 enables the front and rear vehicle units 11, 12 to roll relative to each other about said axis X of the rolling link 54.

According to this embodiment, the attachment of the load-carrying frame 40 to the rear vehicle unit 12 is configured such that only pivoting of the load-carrying frame 40 relative to the rear vehicle unit 12 about said rear vertical steering link 72 is allowed.

The load-carrying frame 40 is configured for connection to a front steering device 50. Said front steering device 50 is configured for said pivotal attachment of the load-carrying frame 40 to said front vehicle unit 11. Said front steering device 50 comprises said front vertical steering link 52 and said rolling link 62.

Said front steering device 50 is consequently configured to enable rotation of said front vehicle unit and said load-carrying frame 40 relative to each other about said front vertical steering link 52 and said rolling link 62.

The load-carrying frame 40 is configured for connection to a rear steering device 70. Said rear steering device 70 is configured for said pivotal attachment of the load-carrying frame 40 to said rear vehicle unit 12. Said rear steering device 70 comprises said rear vertical steering link 72.

Said rear steering device 70 is consequently configured to enable rotation of said rear vehicle unit 12 and said load-carrying frame 40 relative to each other about said rear vertical steering link 72.

Said front steering device 50 is thus arranged at the front vehicle unit 11 such that said front vertical steering link 52 is arranged substantially centrally of the front vehicle unit 11.

Said rear steering device 70 is thus arranged at the rear vehicle unit 12 such that said rear vertical steering link 72 is arranged substantially centrally of the rear vehicle unit 12.

The load-carrying frame 40 is arranged to rest on a central area of the front and rear vehicle units 11, 12, respectively, such that the weight of the load carried by the load-carrying frame 40 is carried centrally of the respective vehicle units 11, 12. In more detail, the front and rear steering devices 50, 70 connecting said load-carrying frame 40 with said front and rear vehicle units 11, 12 are arranged centrally of the respective vehicle units 11, 12 such that the weight of the load carried by the load-carrying frame 40 is carried centrally of the respective vehicle unit 11, 12.

The load-carrying frame 40 is arranged to rest on a central area between said track assemblies 21 of the track assembly pair 20 of the front and rear vehicle units 11, 12, such that the weight of the load carried by the load-carrying frame 40 is carried centrally of the respective track assembly pair 20 to optimally distribute the ground pressure of the respective track assembly 21, i.e. to make it as low as possible. In more detail, the front and rear steering devices 50, 70 connecting said load-carrying frame 40 with said front and rear vehicle units 11, 12 are arranged centrally between said track assemblies 21 of the track assembly pair 20 of the respective vehicle unit 11, 12 such that the weight of the load carried by the load-carrying frame 40 is carried centrally of the respective track assembly pair 11, 12.

Consequently, the front and rear steering devices 50, 70 are arranged to carry the load-carrying frame 40.

According to this embodiment, the vehicle 10 is, in accordance with the vehicle exemplified with reference to FIGS. 1-2, configured with a front and a rear centre beam 30, 32 connecting the track assemblies 21 of the track assembly pair of the respective vehicle unit 11, 12.

The front steering device 50 is journaled to said front centre beam 30 of the front vehicle unit 11 about said front vertical steering link 52. The front steering device 50 is journaled to said front centre beam 30 of the front vehicle unit 11 such that the weight of the load carried by the load-carrying frame 40 is carried by the front centre beam 30 via the front steering device 50.

The rear steering device 70 is journaled to said rear centre beam 32 of the rear vehicle unit 12 about said rear vertical steering link 72. The rear steering device 70 is journaled to said rear centre beam 32 of the rear vehicle unit 12 such that the weight of the load carried by the load-carrying frame 40 is carried by the rear centre beam 32 via the rear steering device 70.

The front steering device 50 is journaled to said load-carrying frame 40 about said rolling link 62.

With reference now made to FIG. 4a, distribution of load of the vehicle 10 is illustrated. The load is configured to be distributed over substantially the entire longitudinal extension of the load-carrying frame 40. The load consists of e.g. timber. When the load is distributed over substantially the entire longitudinal extension of the load-carrying frame 40, the centre of gravity GC of the load will be located centrally over the load-carrying frame 40, as illustrated by the filled arrow GC. This implies that the forces F1, F2 generated by the load and consequently distributed over the load-carrying frame 40 act on the respective vehicle unit 11, 12 as illustrated by the non-filled arrows F1, F2.

Consequently, the forces F1 and F2, respectively, generated by the load, will act centrally on the respective vehicle unit 11, 12. Thereby, the pressure from the track assemblies 21 on the ground G, i.e. the ground pressure, will be evenly distributed over the contact surface between the ground G and the endless tracks 25 of the track assemblies. This creates a low ground pressure which is advantageous since damages to the ground are hereby efficiently minimized.

The force F1 acting on the front vehicle unit 11 is arranged to act on the front steering device connected to the load-carrying frame 40, substantially in the direction of the axis of the front vertical steering link 52 of the rear steering device 50.

The force acting on the rear vehicle unit 12 is arranged to act on the rear steering device connected to the load-carrying frame 40, substantially in the direction of the axis of the rear vertical steering link 72 of the rear steering device 70.

Said load-carrying frame 40 of the vehicle 10 is arranged for supporting the vehicle structure, according to this alternative in form of U-beam configuration, loading gate and crane. Said crane is arranged to be attached to a crane attachment 44a of the load-carrying frame 40.

A power supply 5, such as an internal combustion engine illustrated in FIG. 2, is arranged to be supported centrally of the front vehicle unit 11. In more detail, the power supply 5 is arranged to be supported by the front steering device 50 connected to the load-carrying frame 40. This provides for improved weight distribution of the front vehicle unit 11.

By distributing the load evenly over the vehicle 10, the track assemblies 21 of the track assembly pair 20 of the front vehicle unit 11 and the track assemblies 21 of the track assembly pair 20 of the rear vehicle unit 12 of the tracked vehicle 10 carry the same load, allowing the track assemblies 21 of the front vehicle unit and the rear vehicle unit to be equally sized. This allows similar track assemblies to be used for the front and the rear vehicle units 11, 12, and so that similar vehicle units 11, 12 comprising similar centre beams 30, 32 and similar suspension configurations for suspension and resilient suspension of track assemblies, thus reducing the number of vehicle components and so the manufacturing costs, stock of spare parts and maintenance.

Figure 6A:
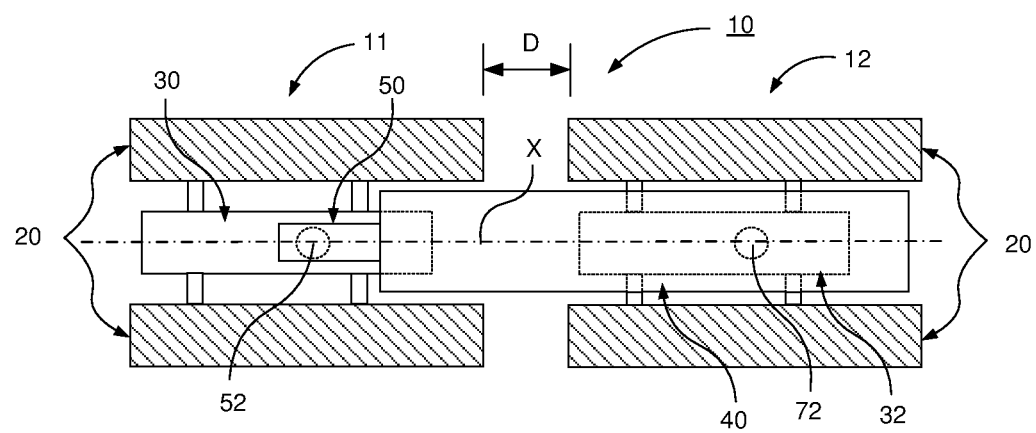
FIG. 6a schematically illustrates a top view of a vehicle with a front and a rear vehicle unit connected to a load-carrying frame of the present invention, where the vehicle is in a basic position in which the longitudinal extensions of the front and rear vehicle units are aligned.

In a basic position, said front and rear vehicle units 11, 12 are arranged relative to each other such that the longitudinal extension of the front vehicle unit 11 is substantially aligned with the longitudinal extension of the rear vehicle unit 12. In said basic position, said front and rear vehicle units 11, 12 are arranged relative to each other such that the track assemblies 21 of the track assembly pair 20 of the front vehicle unit 11 are substantially aligned with the track assemblies 21 of the track assembly pair of the rear vehicle unit 12. In said basic position, said front and rear vehicle units 11, 12 are arranged relative to each other such that the longitudinal extension of the centre beam of the front vehicle unit is substantially aligned with the longitudinal extension of the centre beam of the rear vehicle unit 12. In said basic position, the front and the rear vehicle units 11, 12 are arranged relative to each other such that the longitudinal extension of the load-carrying frame 40 is aligned with the longitudinal extensions of the front and rear vehicle units 11, 12. FIG. 6a illustrates said basic configuration of the vehicle 10.

In said basic position of the front and rear vehicle units 11, 12 of the vehicle 10, the load-carrying frame 40 is arranged to extend over a rear section of the front vehicle unit 11 and extend substantially over the rear vehicle unit 12 such that the weight of load carried by the load-carrying frame 40 is carried centrally of the respective track assembly pair 20.

In said basic position of the front and rear vehicle units 11, 12 of the vehicle 10, the load-carrying frame 40 is arranged to extend over the front vehicle unit 11 such that said front steering device 50 rests on the front centre beam 30.

In said basic position of the front and rear vehicle units 11, 12 of the vehicle 10, the load-carrying frame 40 is configured to extend over the rear centre beam 32 of said rear vehicle unit 12, such that said rear steering device 70 rests on the rear centre beam 32.

Said front steering device 50 comprises front steering members in form of steering cylinders 54a, 54b for steering the front vehicle unit 11 and the load-carrying frame 40 relative to each other. In more detail, the front steering device 50 comprises a first and a second front steering cylinder 54a, 54b arranged to rotate said front vehicle unit 11 and said load-carrying frame 40 relative to each other about said front vertical steering link 52. Said first and second steering cylinders 54a, 54b are arranged on opposite sides of the axis Y1 of said front vertical steering link 52. Said first and second front steering cylinder 54a, 54b is in one of its end pivotally attached to the front centre beam 30 and in its other end pivotally attached to the front vertical steering link 52 of the front steering device 50.

Said first and second front steering cylinder 54a, 54b comprises a respective cylinder and a piston provided with a piston rod. Said cylinder of the first and second front steering cylinders 54a, 54b is pivotally attached to the front centre beam 30 and said piston rod is pivotally attached to the front vertical steering link 52 of the front steering device 50. Said first and second front steering cylinders 54a, 54b are, according to this alternative, hydraulic steering cylinders.

Said front steering device 50 comprises roll steering elements in form of roll steering cylinders 64a, 64b for steering the front vehicle unit 11 and the load-carrying frame 40 relative to each other. In more detail, the front steering device 50 comprises a first and a second front roll steering cylinder 64a, 64b arranged to rotate said vehicle unit 11 and said load-carrying frame 40 relative to each other about said rolling link 62. Said first and second front roll steering cylinders 64a, 64b are arranged on opposite sides of the axis X of said rolling link 62. Said first and second front roll steering cylinder 64a, 64b is in one end pivotally attached to the load-carrying frame 40 and in its other end pivotally attached to the rolling link 62 of the front steering device 50.

Said roll steering cylinders 64a, 64b are, according to one alternative, provided with functionality for stabilizing the vehicle units 11, 12 relative to each other, and functionality for enhanced comfort. According to one alternative, said roll steering cylinders 64a, 64b are provided with a locking functionality to stabilize the front vehicle unit 11 in relation to the rear vehicle unit 12 and the load-carrying frame 40. According to one alternative, said roll steering cylinders 64a, 64b are provided with damping functionality to enhance vehicle comfort. According to one alternative, said roll steering cylinders 64a, 64b are provided with angle adjustment functionality for adjusting the angle so as to e.g. level the load-carrying frame 40.

Said first and second roll steering cylinder 64a, 64b comprises a respective cylinder and a piston provided with a piston rod. Said cylinder of the first and second roll steering cylinder is pivotally attached to the load-carrying frame 40 and said piston rod is pivotally attached to the rolling link 62 of the front steering device 50. Said first and second roll steering cylinders 64a, 64b are, according to this alternative, hydraulic steering cylinders.

Said rear steering device 70 comprises rear steering members in form of steering cylinders 54a, 54b for steering the rear vehicle unit 12 and the load-carrying frame 40 relative to each other. In more detail, the rear steering device 70 comprises a first and a second rear steering cylinder 74a, 74b arranged to rotate said rear vehicle unit 12 and said load-carrying frame 40 relative to each other about said rear vertical steering link 72. Said first and second steering cylinders 54a, 54b are arranged on opposite sides of the axis Y2 of said rear vertical steering link 72. Said first and second rear steering cylinder 74a, 74b is in one of its end pivotally attached to the centre beam and in its other end pivotally attached to the rear vertical steering link 72 of the rear steering device 70.

Said first and second rear steering cylinder 74a, 74b comprises a respective cylinder and a piston provided with a piston rod. Said cylinder of the first and second rear steering cylinders 74a, 74b is pivotally attached to the centre beam 30 and said piston rod is pivotally attached to the rear vertical steering link 72 of the rear steering device 70. Said first and second rear steering cylinders 74a, 74b are, according to this alternative, hydraulic steering cylinders.

According to the embodiment described above the front steering device 50 comprises first and second steering members in form of first and second steering cylinders 54a, 54b, and first and second roll steering members in form of roll steering cylinders 64a, 64b, and the rear steering device 70 first and second steering members in form of first and second steering cylinders 74a, 74b, wherein the steering cylinders 54a, 54b, 74a, 74b and the roll steering cylinders 64a, 64b are constituted by hydraulic steering cylinders/roll steering cylinders with cylinder and piston rod.

Any suitable steering members/roll steering members could alternatively be used. According to one embodiment, the steering members and/or the roll steering members of said front steering device 50 and/or the steering members of said rear steering device 70 are constituted by steering rack members. According to one embodiment the steering members and/or the roll steering members of said front steering device 50 and/or the steering members of said rear steering device 70 are constituted by a linear motor, which, according to one alternative, is constructed with a ball screw and a ball nut arranged to move along the ball screw, wherein the nut is arranged to be moved by rotating the ball screw by means of an electric motor.

Instead of said front steering members being constituted by a first and a second steering cylinder, said front steering members could, according to one alternative, consist of a single steering cylinder for steering the front vehicle unit relative to the load-carrying frame about the axis of the front vertical steering link.

Instead of said rear steering members being constituted by a first and a second steering cylinder, said rear steering members could, according to one alternative, consist of a single steering cylinder for steering the rear vehicle unit relative to the load-carrying frame about the axis of the rear vertical steering link.

Instead of said roll steering members being constituted by a first and a second roll steering cylinder, said roll steering members could, according to one alternative, consist of a single roll steering cylinder for steering the front vehicle unit relative to the load-carrying frame about the axis of the rolling link.

The vehicle 10 comprises a control unit arranged to individually regulate the control of at least one of said front steering members 54a, 54b, said rear steering members 74a, 74b and said roll steering members 64a, 64b to achieve rotation of said front and rear vehicle units 11, 12 relative to each other.

Preferably, the control unit is arranged to control all of the front steering members 54a, 54b, the rear steering members 74a, 74b and the roll steering members 64a, 64b individually. This means that the vehicle is provided with control means through which the front 11 and the rear 12 vehicle units are individually steerable independently of each other relative to the load-carrying frame 40, about the respective vertical axis Y1, Y2.

With reference now made to FIGS. 5a-b and 6a-d, there is shown a top view of the vehicle units of the vehicle 10. FIGS. 5a-b and 6b-d show the vehicle units 11, 12 of the vehicle 10 in different pivoted positions relative to each other. FIG. 6a shows said basic position of the vehicle 10, i.e. that the vehicle units 11, 12 and the load-carrying frame 40 are not pivoted relative to each other.

Figure 5A:
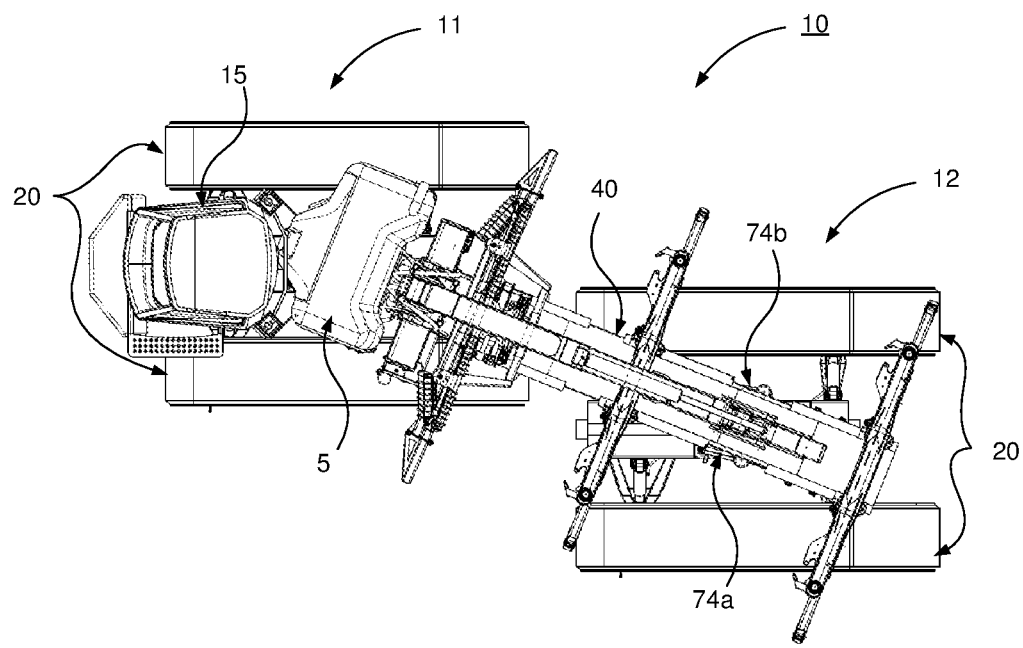
FIG. 5a schematically illustrates a top view of a vehicle with a front and a rear vehicle unit connected to the load-carrying frame shown in FIG. 4a during crab steering according to an embodiment of the present invention.
Figure 6B:
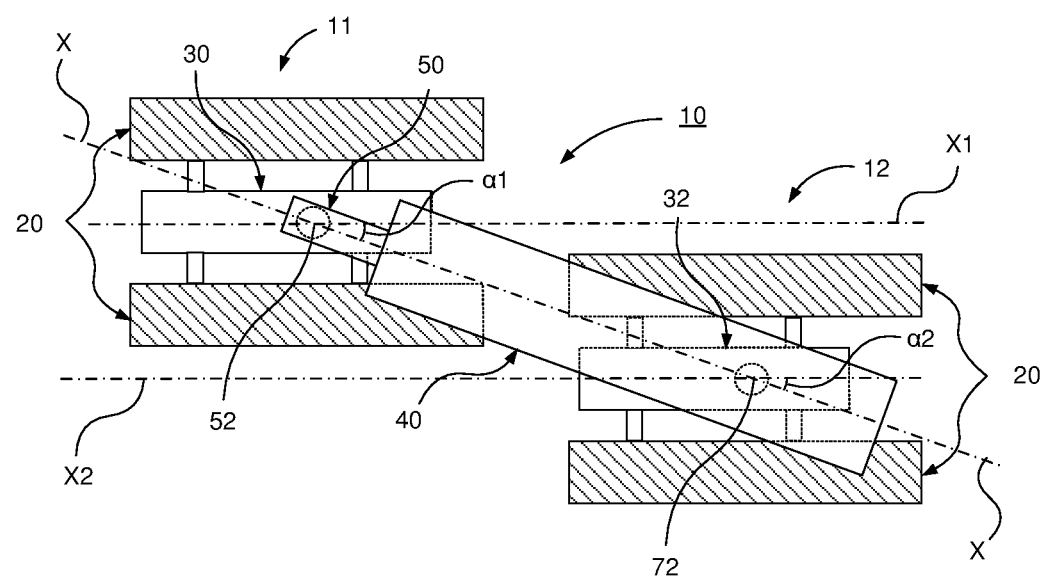
FIG. 6b schematically illustrates a top view of a vehicle with a front and a rear vehicle unit connected with the load-carrying frame shown in FIG. 6a during crab steering according to an embodiment of the present invention.

FIGS. 5a and 6b show the vehicle 10 during so called crab steering, i.e. when the front and rear vehicle units 11, 12 are parallel to each other in their longitudinal extensions and where the load-carrying frame 40 is pivoted relative to said front and rear vehicle units 11, 12 about the respective front and rear vertical steering links 52, 72. This causes the front and rear vehicle units 11, 12 to be displaced in parallel relative to each other such that the load-carrying frame 40 forms a first angle α1 relative to the longitudinal extension of the first vehicle unit 11, and such that the load-carrying frame 40 forms a second angle α2 relative to the longitudinal extension of the second vehicle unit, wherein said first and second angles are substantially equal.

According to one embodiment, said crab steering is achieved by said first and second front steering cylinders 54a, 54b of the front steering device 50 and the first and second rear steering cylinders 74a, 74b of the rear steering device 70 controlling the rotation about the respective axis Y1, Y2 of the respective front and rear vertical steering links 52, 72, such that said first and second angles α1, α2 are formed. According to one embodiment, the steering cylinders 54a, 54b, 74a, 74b are arranged to be locked in this position to maintain the positions of the vehicle units 11, 12 and the load-carrying frame 40 relative to each other during propulsion of the vehicle 10 during said crab steering.

By means of such crab steering the impact on the ground is reduced since the endless tracks 25 of the respective front and rear vehicle units 11, 12 are allowed to pass over different areas of the ground G. Furthermore, said crab steering serves to improve the lateral stability of the vehicle 10.

Figure 5B:
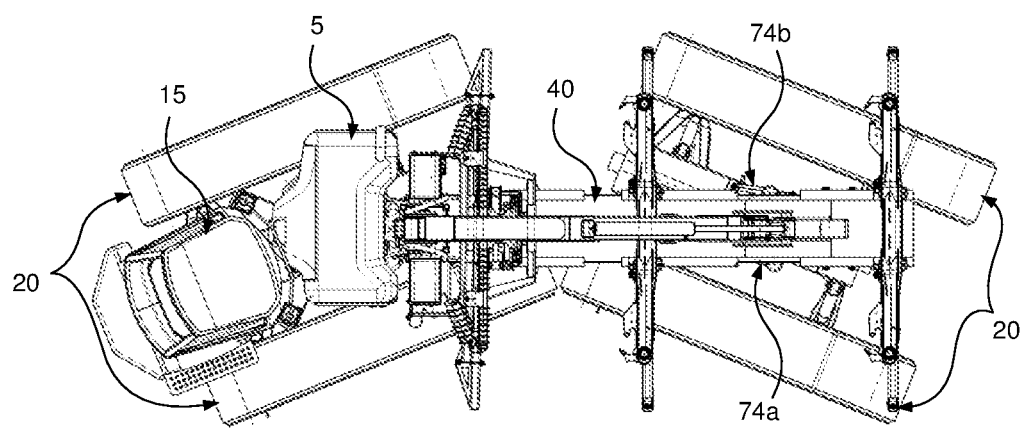
FIG. 5b schematically illustrates a top view of a vehicle with a front and a rear vehicle unit connected to the load-carrying frame shown in FIG. 4a during a steering manoeuvre according to an embodiment of the present invention.
Figure 6C:
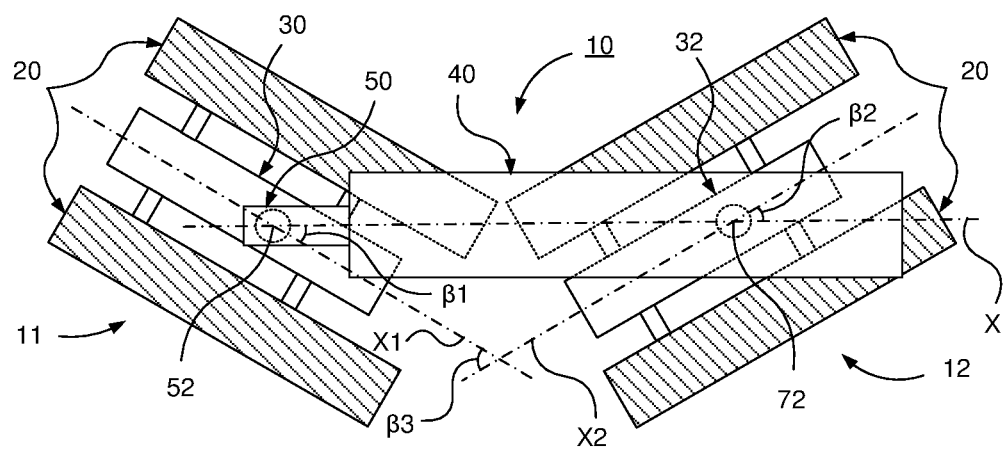
FIG. 6c schematically illustrates a top view of a vehicle with a front and a rear vehicle unit connected with the load-carrying frame shown in FIG. 6a during a steering manoeuvre according to an embodiment of the present invention.
Figure 6D:
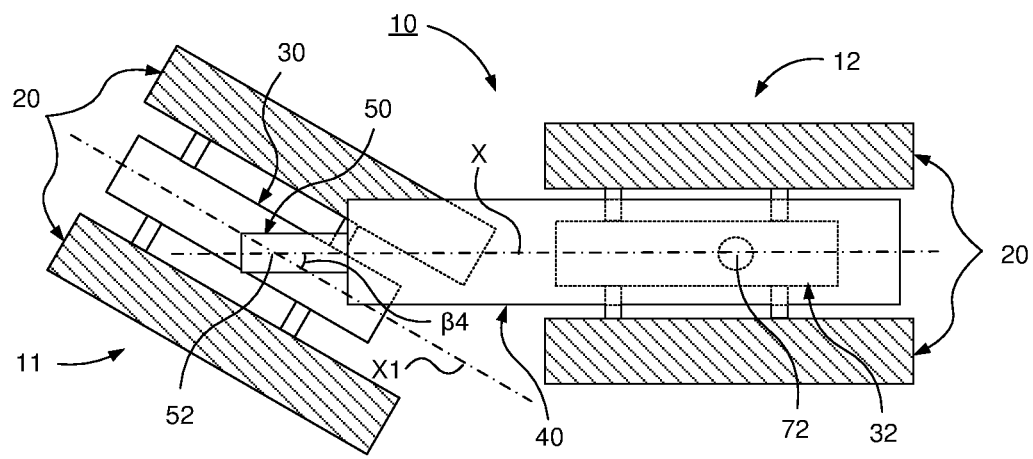
FIG. 6d schematically illustrates a top view of a vehicle with a front and a rear vehicle unit connected with the load-carrying frame shown in FIG. 6a during a steering manoeuvre according to an embodiment of the present invention.

FIGS. 5b and 6c and 6d show pivoting of said front and rear vehicle units relative to each other and the load-carrying frame 40 during a so called steering manoeuvre, where the steering manoeuvre is achieved by rotation of said first and/or second vehicle units 11, 12 relative to the load-carrying frame 40.

According to the example of a steering manoeuvre shown in FIGS. 5b and 6c, the front and rear vehicle units 11, 12 are pivoted relative to each other and the load-carrying frame 40 about the respective front and rear vertical steering links 52, 72. This causes the front and rear vehicle unit 11, 12 to be pivotally displaced in relation to each other such that the load-carrying frame 40 forms a first angle $\beta 1$ relative to the longitudinal extension X1 of the first vehicle unit 11, and such that the load-carrying frame 40 forms a second angle $\beta 2$ relative to the longitudinal extension X2 of the second vehicle unit 12, wherein said first and second angles $\beta 1$, $\beta 2$ may be different or equal in degrees. Hereby, during said steering manoeuvre, the number of degrees of the first or the second angle $\beta 1$, $\beta 2$ may be substantially zero. Furthermore, this implies that the front and rear vehicle units 11, 12 are pivotally displaced relative to each other such that they form an angle $\beta 3$ relative to each other's longitudinal extensions X1, X2.

According to one embodiment, said steering manoeuvre is achieved by said first and second front steering cylinders of the front steering device 50 and said first and second rear steering cylinders of the rear steering device 70 controlling the rotation about the respective axis Y1, Y2 of the respective front and rear vertical steering links 52, 72, such that said first and second angles $\beta 1$, $\beta 2$ are formed. According to one embodiment, the steering cylinders 54a, 54b, 74a, 74b are arranged to be locked in this position to maintain the positions of the vehicle units 11, 12 and the load-carrying frame 40 relative to each other during propulsion of the vehicle 10 during said steering manoeuvre.

According to the embodiment of the steering manoeuvre shown in FIG. 6d, the front vehicle unit 11 is pivoted relative to the load-carrying frame 40 about the front vertical steering link 52. This implies that the front vehicle unit 11 is pivotally displaced relative to the rear vehicle unit 12 and the load-carrying frame such that the load-carrying frame 40 forms an angle $\beta 4$ relative to the longitudinal extension X1 of the first vehicle unit 11.

Through such a steering manoeuvre it is rendered possible for the endless tracks 25 of the rear vehicle unit 12 to run in the same tracks as the endless tracks 25 of the front vehicle unit 11 during the steering manoeuvre. Consequently, by means of such a steering manoeuvre, tracking is enabled such that the endless tracks 25 of the rear vehicle unit 12 does not crosscut during ongoing steering manoeuvre but are made to run in the same tracks as the endless tracks 25 of the front vehicle unit 11. This enables e.g. a forestry vehicle such as a forwarder to be driven at higher speeds since there is no risk that the track assemblies 21 of the rear vehicle unit 12 bumps into an obstacle which has been avoided by the track assemblies 21 of the front vehicle unit 11 during off-road driving.

Thus, by pivoting the vehicle units 11, 12 relative to the load-carrying frame 40 about a front and a rear vertical steering link 52, 72 instead of, as in conventional articulated vehicles, e.g. as shown in FIG. 1, pivoting the vehicle units about a vertical steering link arranged in between the vehicle units, the manoeuvrability of the vehicle is improved since a larger steering angle can be obtained. Furthermore, the lateral stability of the vehicle 10 is improved by means of said steering manoeuvre as compared to steering in accordance with the above-mentioned conventional articulated vehicle.

FIG. 7a-c schematically illustrate various views of parts of the front steering device 50 for the front vehicle unit 11, arranged to be connected to and interact with the load-carrying frame 40 according to the present invention.

The front steering device 50 is journaled in said front centre beam 30 The front steering device 50 is pivotally journaled at said front centre beam 30. The front steering device 50 is journaled in said load-carrying frame 40. The front steering device 50 is pivotally journaled at said load-carrying frame 40.

The front steering device 50 comprises a front steering bearing configuration 52 for pivoting of the front vehicle unit 11 relative to the load-carrying frame 40 about said axis Y1 running substantially perpendicular to the longitudinal and lateral extensions of the front vehicle unit 11. The front steering bearing configuration 52 comprises said front vertical steering link 52.

Said front steering bearing configuration 52 is annularly configured. Said front steering bearing configuration 52 comprises an outer bearing ring 52a arranged to be attached to said front centre beam 30. Said outer bearing ring 52a is, according to this embodiment, arranged to be attached to the upper side of said front centre beam 30. Said outer bearing ring 52a is, according to this embodiment, arranged to be attached to said front centre beam 30 such that its centre axis Y1 is oriented substantially centrally relative to the longitudinal extension of the track assembly pair 20 of the front vehicle unit 11. Said outer bearing ring 52a is arranged to be attached to said front centre beam 30 by means of fastening members 55, wherein said fastening members according to one embodiment consist of a screw joint and/or a rivet joint and/or a bolt joint.

Said front steering bearing configuration 52 comprises an inner bearing ring 52b arranged inside said outer bearing ring 52a. Said inner bearing ring 52b is rotatably arranged relative to said outer bearing ring 52a via a sealing-provided bearing 53 for said pivotally journaled attachment. Said inner bearing ring 52b is hence rotatably arranged relative to said front centre beam 30 about an axis Y1 that is perpendicular to the longitudinal and lateral extensions of the front centre beam 30. Said inner bearing ring 52b is rotatably arranged about a vertical axis Y1.

Said front steering device 50 comprises a roll bearing configuration 62 for rotation of the front vehicle unit 11 relative to the load-carrying frame 40 about an axis running substantially in the longitudinal extension of the load-carrying frame 40. The roll bearing configuration 62 comprises said roll link 62.

Said roll bearing configuration 62 is fixedly connected to said steering bearing configuration 52 such that force acting on the roll bearing configuration 62 is transferred to and absorbed by the steering bearing configuration 52. Said roll bearing configuration 62 is adapted to be supported by said steering bearing configuration 52.

Said roll bearing configuration 62 is cylindrically configured. Said roll bearing configuration 62 is arranged to be attached to said load-carrying frame 40 and to said steering bearing configuration 52. Said roll bearing configuration 62 comprises a bearing housing 63. Said bearing housing 63 is arranged to be attached to said inner bearing ring 52b by means of fastening elements 56, wherein said fastening elements according to one embodiment consists of a screw joint and/or rivet joint and/or bolt joint.

Said bearing housing 63 is arranged on top of said steering bearing configuration 52. Said bearing housing 63 comprises a cylindrical body arranged to run across said steering bearing configuration. Said bearing housing 63 is arranged on said steering bearing configuration 52 such that the centre axis X of the cylindrical body of the bearing housing 63 crosses the centre axis Y1 of the steering bearing configuration 52.

Said bearing housing 63 comprises support portions 68 arranged to supportively carry and connect the cylindrical body of the bearing housing 63 to said inner bearing ring 52b.

The bearing housing 63 of the roll bearing configuration 62 is attached to said inner bearing ring 52b of the front steering bearing configuration 52. The bearing housing 63 is thus fixedly connected to the inner bearing ring 52b.

Said roll bearing configuration 62 further comprises an inner roll bearing cylinder 65 arranged inside the cylindrical body of the bearing housing 63. Said roll bearing cylinder 65 is concentrically arranged relative to said cylindrical body of the bearing housing 63. Said roll bearing cylinder 65 is rotatably arranged relative to the cylindrical body of said bearing housing 63. Said inner roll bearing cylinder 65 is rotatably arranged relative to the cylindrical body of said bearing housing 63. Said inner roll bearing cylinder 65 is thus rotatably arranged relative to said front centre beam 30 about an axis X arranged to run in the main longitudinal extension of the load-carrying frame 40.

Said cylindrical body of the bearing housing 63 has a first end 63a intended to face the load-carrying frame 40, and an opposite second end 63b. Said first end 63a has a larger diameter than the opposite second end 63b.

Said inner roll bearing cylinder 65 has a first end 65a intended to face the load-carrying frame 40, and an opposite second end 65b. Said first end 65a has a larger diameter than the opposite second end 65b. Said first end 65a of the inner roll bearing cylinder 65 is arranged to protrude from the cylindrical body of the bearing housing 63. Said first end 65a of said roll bearing cylinder 65 is configured to be attached to the end 40a of the load-carrying frame 40 facing the front steering device 50. The first end 65a of the roll bearing cylinder comprises, according to this embodiment, connection points for a bolt joint or similar.

Said inner roll bearing cylinder 65 is rotatably journaled relative to the cylindrical body of the bearing housing 63 via a first bearing 66a arranged at the first end 63a of the cylindrical body of the bearing housing 63, and a second bearing 66b arranged at the second end of the cylindrical body of the bearing housing 63.

Said inner roll bearing cylinder 65 is arranged to be attached to the load-carrying frame 40. Said inner roll bearing cylinder 65 is arranged to be attached to the end region of the load-carrying frame 40 facing the front steering device 50 of the front vehicle unit 11. Said inner roll bearing cylinder is arranged to be attached to said load-carrying frame 40 by means of fastening elements, wherein said fastening elements according to one embodiment of a screw joint and/or a rivet joint and/or a bolt joint.

The roll bearing configuration further comprises first and second attachment elements 67a, 67b for pivotal attachment of the above mentioned first and second roll steering cylinders 64a, 64b, disposed at the bearing housing 63 on the respective sides of the bearing housing 63.

The front steering bearing configuration 52 comprises first and second attachment elements, not shown in FIG. 7a-c, for pivotal attachment of the above mentioned first and second front steering cylinders 54a, 54b, arranged on respective sides of outer bearing ring 52a.

From the above description and by studying FIG. 4a-4c in conjunction with FIG. 7a-7c it is realized that the roll bearing configuration 62 and the load-carrying frame 40 are arranged relative to each other such that the axis X of said rolling link runs through the load-carrying frame 40. This means that the rolling link X and the load-carrying frame 40 are located in substantially the same horizontal plane.

The roll bearing configuration 62 is arranged directly in front of the load-carrying frame 40 and is preferably positioned centrally in front of the load-carrying frame, where it is attached to the front end of the load-carrying frame. Thereby, the roll bearing configuration 62 is arranged in the extension of the load-carrying frame, in the axial main direction of extension thereof. The roll bearing configuration 62 is further adapted in height relative to the load-carrying frame 40 such that the rolling link axis X runs through the load-carrying frame 40 and preferably through the centre of gravity of the load-carrying frame 40. Said front centre beam 30 is configured to receive said front steering device 50. Said front centre beam 30 is configured to receive said front steering bearing configuration 52 of the front steering device 50.

Figure 8A:
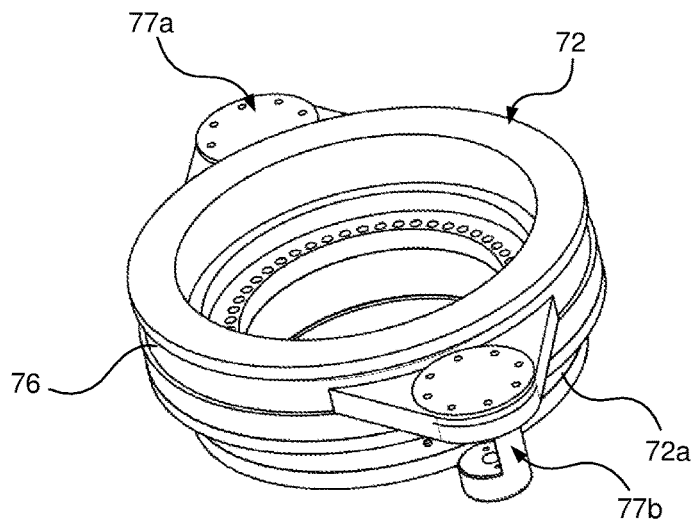
Figure 8B:
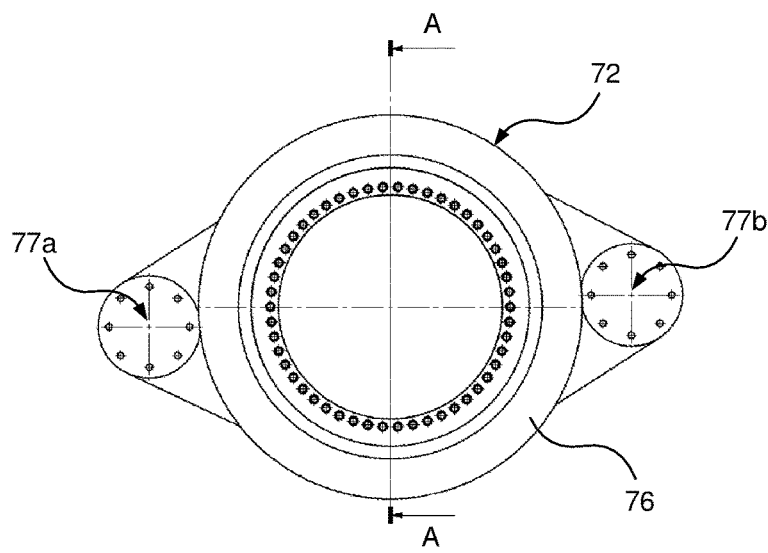
Figure 8C:
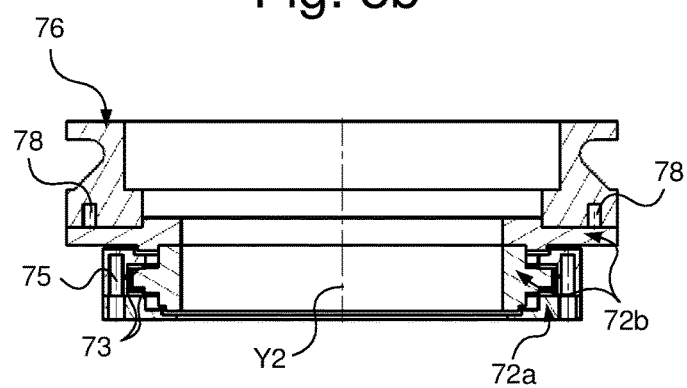
FIG. 8c schematically illustrates a cross section of the steering device shown in FIG. 8b.

FIG. 8a-c schematically illustrate various views of parts of the rear steering device 70 for the rear vehicle unit 12, arranged to be connected to and interact with the load-carrying frame 40 according to the present invention The rear steering device 70 is journaled in said rear centre beam 32. The rear steering device 70 is pivotally journaled at said rear centre beam 32. The rear steering device 70 is journaled in said load-carrying frame 40. The rear steering device 70 is pivotally journaled at said load-carrying frame 40.

The rear steering device 70 comprises a rear steering bearing configuration 72 for pivoting of the rear vehicle unit 12 relative to the load-carrying frame 40 about an axis running substantially perpendicular to the longitudinal and lateral extensions of the rear vehicle unit 12. The rear steering bearing configuration 72 comprises said rear vertical steering link 72.

Said rear steering bearing configuration 72 is annularly configured. Said rear steering bearing configuration 72 comprises an outer bearing ring 72a arranged to be attached to said rear centre beam 32. Said outer bearing ring 72a is, according to this embodiment, arranged to be attached to the upper side of said rear centre beam 32. Said outer bearing ring 72a is, according to this embodiment, arranged to be attached to said rear centre beam 32 such that its centre axis is oriented substantially centrally relative to the longitudinal extension of the track assembly pair 20 of the rear vehicle unit 12. Said outer bearing ring 72a is arranged to be attached to said rear centre beam 32 by means of fastening members 75, wherein said fastening members according to one embodiment consist of a screw joint and/or a rivet joint and/or a bolt joint.

Said rear steering bearing configuration 72 comprises an inner bearing ring 72b arranged inside said outer bearing ring 72a. Said inner bearing ring 72b is rotatably arranged relative to said outer bearing ring 72a via a sealing-provided bearing 73 for said pivotally journaled attachment. Said inner bearing ring 72b is hence rotatably arranged relative to said rear centre beam 30 about an axis Y2 that is perpendicular to the longitudinal and lateral extensions of the rear centre beam 32. Said inner bearing ring 72b is rotatably arranged about a vertical axis Y2.

Said rear vertical steering link 72 is comprised of said inner bearing ring 72b. Said inner bearing ring 72b is thus rotatable about the axis Y2 of the rear vertical steering link.

The rear steering bearing configuration 72 comprises first and second attachment elements 77a, 77b for pivotal attachment of the above mentioned first and second rear steering cylinders 74a, 74b, disposed on respective sides of the outer bearing ring 72a.

Said rear centre beam 32 is configured to receive said rear steering device 70. Said rear centre beam 32 is configured to receive said rear steering bearing configuration of the rear steering device 70.

Said inner bearing ring 72b is, according to this embodiment, arranged to be attached to a bearing element 76 of said rear steering bearing configuration 72 to said inner bearing ring 72b by means of fastening elements 78, wherein said fastening elements according to one embodiment consist of a screw joint and/or a rivet joint and/or a bolt joint.

Said inner bearing ring 72b is, according to this embodiment, arranged to be attached via said bearing member 76 to the underside of said load-carrying frame 40. Said inner bearing ring 72b is, according to this embodiment, arranged to be attached to said load-carrying frame 40 such that its centre axis Y2 is oriented substantially centrally relative to the longitudinal extension of the track assembly pair of the rear vehicle unit 12. Said inner bearing ring 72b is arranged to be attached to said load-carrying frame 40 by means of fastening elements 78, wherein said fastening elements according to one embodiment consist of a screw joint and/or a rivet joint and/or a bolt joint.

FIG. 9 shows the front centre beam arranged for connection with said track assembly pair 20 and the load-carrying frame 40. Here, the front steering cylinders 54a, 54b and the front vertical steering link 52 are shown.

Said centre beam 30 is arranged to support vehicle structures. Said centre beam 30 comprises attachment points 33, 34 arranged on the underside and the side of said centre beam 30, wherein said attachment points 33, 34 are configured for attachment of resilient track assembly suspension.

The front centre beam 30 has a front side 30a facing forward of the front vehicle unit 11 and a rear side 30b facing backwards of the front vehicle unit 11. The front centre beam 30 further has a top side 30c for connection to the load-carrying frame 40 and a bottom side 30d for connection to the track assembly pair 20 via the trailing arm configuration of the suspension device of the vehicle. The rear centre beam 32 is, in one embodiment, designed substantially similar to the front centre beam 30.

Above there has been described a load-carrying frame for an articulated tracked vehicle having a front and a rear vehicle unit, where the load-carrying frame is pivotally connected to a front vertical steering link arranged centrally of the front vehicle unit and pivotally connected to a rear vertical steering link arranged centrally of the rear vehicle unit such that the front and rear vehicle units are pivotable relative to each other and the load-carrying frame. According to an alternative embodiment, the load-carrying frame is only pivotally connected to the front vertical steering link and fixedly connected to the rear vehicle unit, preferably such that the load-carrying frame runs in the longitudinal extension of the rear vehicle unit.

The foregoing description of the preferred embodiments of the invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling other skilled in the art to understand the invention for various embodiments and with the various modifications as are suited to the particular use contemplated.

The invention claimed is:

1. A load-carrying frame for carrying an external load of an articulated tracked vehicle comprising a front vehicle unit and a rear vehicle unit connected to each other through said load-carrying frame, wherein said front vehicle unit comprises a rolling link,
   wherein the load-carrying frame is disposed on top of the front and rear vehicle units so as to directly accommodate the external load, and
   the load-carrying frame is configured for rotatable attachment to the front vehicle unit via said rolling link for enabling rotation of the front vehicle unit relative to the load-carrying frame about an axis of said rolling link running through said load-carrying frame, in an axial main direction of extension of the load-carrying frame.

2. The load-carrying frame of claim 1, wherein the load-carrying frame is configured for rotatable attachment to the front vehicle unit via said rolling link such that the axis of the rolling link runs substantially through the centre of gravity of the load-carrying frame.

3. The load-carrying frame of claim 1, wherein a front end of the load-carrying frame is configured for rotatable attachment to a roll bearing configuration comprising said rolling link, so as to effectuate rotation of the load-carrying frame relative to the front vehicle unit, about the rolling link axis.

4. The load-carrying frame of claim 3, wherein the roll bearing configuration comprises a roll bearing cylinder and a bearing housing, wherein the roll bearing cylinder is rotatably journaled in said bearing housing and the front end of the load-carrying frame is configured for attachment to said roll bearing cylinder.

5. The load-carrying frame of claim 1, wherein the load-carrying frame further is configured for pivotal attachment to said front vehicle unit via a front vertical steering link to enable pivoting of said front vehicle unit relative to the load-carrying frame about a substantially vertical axis of the front vertical steering link.

6. The load-carrying frame of claim 5, wherein said front vertical steering link is arranged substantially centrally of the front vehicle unit.

7. The load-carrying frame of claim 5, wherein the load-carrying frame is configured for pivotal attachment to said front vehicle unit via a steering device comprising both said rolling link and said front vertical steering link.

8. The load-carrying frame of claim 1, wherein the load-carrying frame is also configured for pivotal attachment to said rear vehicle unit via a rear vertical steering link to enable pivoting of said rear vehicle unit relative to the load-carrying frame about a substantially vertical axis of the rear vertical steering link.

9. The load-carrying frame of claim 1, wherein the load-carrying frame is rigidly configured and configured to distribute the load substantially centrally over said front and rear vehicle units.

10. A vehicle, for example a tracked vehicle, comprising the load-carrying frame of claim 1.

11. The vehicle of claim 10, wherein said vehicle is a forestry machine.

12. The vehicle of claim 10, wherein said vehicle is a tracked forwarder.

13. The vehicle of claim 10, wherein said vehicle is a diesel-electric vehicle.

14. The load-carrying frame of claim 1, wherein the load-carrying frame is configured for rotatable attachment to the front vehicle unit via said rolling link such that the axis of the rolling link runs substantially through the centre of gravity of the load-carrying frame.

* * * * *